United States Patent
Hekstra et al.

(10) Patent No.: US 9,485,609 B2
(45) Date of Patent: Nov. 1, 2016

(54) PULSE FREQUENCY CONTROL FOR WIRELESS COMMUNICATIONS AND RANGING

(71) Applicant: NXP B.V., Eindhoven (NL)

(72) Inventors: Andries Hekstra, Eindhoven (NL); Arie Koppelaar, Giessen (NL); Stefan Drude, Waalre (NL); Frank Leong, Veldhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/615,696

(22) Filed: Feb. 6, 2015

(65) Prior Publication Data

US 2016/0234008 A1 Aug. 11, 2016

(51) Int. Cl.
*H04W 4/00* (2009.01)
*B60R 25/24* (2013.01)
(Continued)

(52) U.S. Cl.
CPC ............ *H04W 4/008* (2013.01); *B60R 25/246* (2013.01); *G01S 13/82* (2013.01); *G07C 9/00309* (2013.01); *H04L 9/32* (2013.01); *H04L 9/3223* (2013.01); *H04L 9/3271* (2013.01); *H04W 12/08* (2013.01); *G07C 2009/00317* (2013.01); *H04L 7/027* (2013.01); *H04L 9/005* (2013.01); *H04W 12/06* (2013.01)

(58) Field of Classification Search
CPC ......... H04L 9/00; H04L 9/005; H04L 9/001; H04L 9/06; H04L 9/0643; H04L 9/3223; H04L 9/32; H04L 9/3271; H04L 7/0008; H04L 7/0012; H04L 7/027; G01S 13/79; G01S 13/76; G01S 13/765; G01S 13/767; G01S 13/78; G01S 13/788; G01S 13/785; G01S 13/82; B60R 25/24; B60R 25/245; B60R 25/246; G07C 9/00309; G07C 2209/61; G07C 2209/63; G07C 2009/00412; G07C 2009/00333; G07C 2009/00317; H04W 4/008; H04W 12/06
See application file for complete search history.

(56) References Cited

U.S. PATENT DOCUMENTS 5,828,693 A * 10/1998 Mays .................. G06K 7/0008
375/136
7,444,118 B2 10/2008 Boh et al.
(Continued)

FOREIGN PATENT DOCUMENTS

WO 0125060 A3 4/2001

OTHER PUBLICATIONS

"Clock," in IEEE Std 100-2000, 2000, IEEE Press, 7th ed., p. 177.*
(Continued)

*Primary Examiner* — Michelle M Koeth (57) ABSTRACT

Using a clock circuit, a clock signal is generated at a base frequency. A frequency adjustment circuit selects, based upon a frequency offset value, a particular frequency adjustment value from a plurality of frequency adjustment values. An adjusted clock signal is provided that has a frequency corresponding to the base frequency as modified by the particular frequency adjustment value. Wireless communication signals are received at a wireless communication circuit. From the communication signals, a set of received wireless communication pulses are identified that have a pulse repetition frequency that corresponds to the adjusted clock signal. A distance ranging protocol is applied, using a processing circuit, to the identified set of received communication pulses.

18 Claims, 9 Drawing Sheets

(51) Int. Cl.
  H04L 9/32    (2006.01)
  G07C 9/00    (2006.01)
  H04W 12/08   (2009.01)
  G01S 13/82   (2006.01)
  H04W 12/06   (2009.01)
  H04L 7/027   (2006.01)
  H04L 9/00    (2006.01)

(56) References Cited

U.S. PATENT DOCUMENTS

| | | | | |
|---|---|---|---|---|
| 8,620,394 | B2 | 12/2013 | Sebastiano et al. | |
| 8,750,504 | B1* | 6/2014 | Muise | G06F 7/588 380/44 |
| 2004/0062280 | A1* | 4/2004 | Jeske | H04J 3/0667 370/517 |
| 2004/0234073 | A1* | 11/2004 | Sato | H04L 9/0891 380/28 |
| 2007/0130497 | A1* | 6/2007 | Chambers | H04L 1/0045 714/780 |
| 2008/0019309 | A1* | 1/2008 | Kwun | H04L 5/0053 370/329 |
| 2008/0284564 | A1* | 11/2008 | Leitch | B60R 25/24 340/5.61 |
| 2010/0150117 | A1* | 6/2010 | Aweya | G01S 5/14 370/338 |
| 2012/0105219 | A1* | 5/2012 | Kofler | H04B 5/0062 340/426.16 |
| 2013/0157599 | A1* | 6/2013 | Ray | G01S 13/34 455/130 |
| 2013/0214732 | A1 | 8/2013 | Nowottnick | |
| 2014/0220919 | A1* | 8/2014 | Yang | H04L 27/16 455/192.2 |
| 2014/0354469 | A1* | 12/2014 | Park | G01S 13/103 342/195 |

OTHER PUBLICATIONS

"Passive Keyless Entry (PKE)," Philips Semiconductors, Document No. 939775910317, Oct. 2002.*

"Radar," in IEEE Std 100-2000 , 2000, IEEE Press, 7th ed., p. 906.*

Flury et al., "Effectiveness of Distance-Decreasing Attacks Against Impulse Radio Ranging", WiSec 2010.

Poturalski et al., "Distance Bounding with IEEE 80215.4a: Attacks and Countermeasures", IEEE Transactions on Wireless Communications, vol. 10, No. 4, Apr. 2011.

Poturalski et al., "On Secure and Precise IR-UWB Ranging", IEEE Transactions on Wireless Communications, vol. 11, No. 3, Mar. 2012.

AMS, AS3932 Datasheet—Applications "3D Low Frequency Wakeup Receiver", Revision 1.7, pp. 1-34, www.ams.com/LF-Receiver/AS3932.

M. van Elzakker et al., "A 10-bit Charge-Redistribution ADC Consuming 1.9uW at 1 MS/s," IEEE JSSC, May 2010.

I.-Y. Lee et al., "A Fully Integrated TV Tuner Front-End with 3.1 dB NF, >+31dBm OIP3, >83dB HRR3/5 and >68dB HRR7," IEEE ISSCC, 2014.

Harpe et al., "A 0.47-1.6 mW 5-bit 0.5-1 GS/s Time Interleaved SAR ADC for Low-Power UWB Radios," IEEE JSSC, Jul. 2012.

J. van Sinderen et al., "Wideband UHF ISM-Band Transceiver Supporting Multichannel Reception and DSSS Modulation," IEEE ISSCC, 2013.

Extended European Search Report for Patent Appln. No. 16153810.3 (Jun. 23, 2016).

Hancke G.P. et al. "An RFID Distance Bounding Protocol", IEEE First International Conference on Security and Privacy for Emerging Areas in Communications Networks, pp. 67-73 (Sep. 2005).

* cited by examiner

PULSE FREQUENCY CONTROL FOR WIRELESS COMMUNICATIONS AND RANGING

Aspects of various embodiments are directed to wireless communication solutions and more particular aspects are directed toward frequency adjustments for wireless communications in distance ranging solutions.

Wireless, or radio frequency (RF), systems can be designed to determine distances between two devices that are in communication. In some instances, the determined distances can be based upon the time-of-flight (ToF) for RF signals transmitted between the devices. The RF signals can include a set of pulses that are repeated according to a pulse repetition frequency that is set according to the communication protocol(s) being used and according to the distances being measured. Collisions between multiple RF transmissions can delay the distance determination process and associated functionality.

Various embodiments are directed toward wireless enabled devices that are configured to provide ranging functions using communications in which pulse repetition frequencies are selected and applied to mitigate interference between different devices.

Certain embodiments are directed toward a device that includes a signal generation circuit. The signal generation circuit can include a clock circuit that is configured to generate a clock signal having a base frequency and a frequency adjustment circuit that is configured to receive a frequency offset value; select, based upon the frequency offset value, a particular frequency adjustment value from a plurality of frequency adjustment values; and provide an adjusted clock signal having a frequency corresponding to the base frequency as modified by the particular frequency adjustment value. The signal generation circuit can include a wireless communication circuit that is configured to receive communication signals; and identify, from the communication signals, a set of received wireless communication pulses that have a pulse repetition frequency that corresponds to the adjusted clock signal. A processing circuit can be configured to apply a ranging protocol to the identified set of received communication pulses.

Various embodiments are directed toward a method that includes generating, using a clock circuit, a clock signal having a base frequency; selecting, using a frequency adjustment circuit and based upon a frequency offset value, a particular frequency adjustment value from a plurality of frequency adjustment values; providing an adjusted clock signal having a frequency corresponding to the base frequency as modified by the particular frequency adjustment value; receiving, at a wireless communication circuit, wireless communication signals; identifying, from the communication signals, a set of received wireless communication pulses that have a pulse repetition frequency that corresponds to the adjusted clock signal; and applying, using a processing circuit, a distance ranging protocol to the identified set of received communication pulses.

Embodiments of the present disclosure are directed toward a system that includes a challenge device. The challenge device can include a first clock circuit that is configured to generate a first clock signal having a base frequency, and a first frequency adjustment circuit that is configured to receive a frequency offset value; select, based upon the frequency offset value, a particular frequency adjustment value from a plurality of frequency adjustment values; and provide a first adjusted clock signal having a frequency corresponding to the base frequency as modified by the particular frequency adjustment value. The challenge device can also include a first wireless communication circuit that is configured to generate a challenge signal having pulses with a frequency responsive to the first adjusted clock signal. The system can include a response device that includes a second clock circuit that is configured to generate a second clock signal having the base frequency and a second frequency adjustment circuit that is configured to receive the frequency offset value; select, based upon the frequency offset value, the particular frequency adjustment value from the plurality of frequency adjustment values; and provide a second adjusted clock signal having a frequency corresponding to the base frequency as modified by the particular frequency adjustment value. The response device can also include a second wireless communication circuit that is configured to receive the challenge signal; and identify, from the challenge signals, a set of wireless communication pulses that correspond to the second adjusted clock signal. A processing circuit of the response device can be configured to create a response signal that is based upon the identified set of wireless communication pulses and that has pulses with a frequency that is responsive to the second adjusted clock signal.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving radio frequency (RF) communications and applications that include distance ranging, and more particular aspects are directed toward varying pulse repetition frequencies for RF distance bounding solutions. While not necessarily so limited, various aspects may be appreciated through a discussion of examples using this context.

Various example embodiments are directed to RF distance bounding solutions in which different RF transmitter circuit and receiver circuit pairs are configured to use different pulse repetition frequencies. Consistent with embodiments of the present disclosure, the corresponding and respective pulse repetition frequencies for different pairs can be selected to mitigate interference between transmissions originating from devices other than a particular pair. For example, pairs of devices can be designed to provide a security function that relies upon distance bounding between the pair of devices. This might include, but is not limited to, a wireless key and a wireless vehicle locking/security system. The device pairs for each vehicle, or other types of systems, can be designed to use a pulse repetition frequency that is different from other device pairs of different vehicles/systems.

Consistent with certain embodiments, the differences between pulse repetition frequencies can be selected to have a granularity that results in pulse repetition frequencies that fall outside of expected error variations. For example, manufacturing tolerances and environmental variables (e.g., expected operating temperature ranges) can be taken into consideration to determine the expected range of deviation from a base/expected pulse repetition frequency. The range can be determined by taking into account expected variations that increase the pulse repetition frequency to set a first value and then taking into account expected variations that decrease the pulse repetition frequency to set a second value of the range. In certain embodiments, the granularity can also be set smaller than frequency offset values used by the communication protocol. For instance, pulse repetition offset values can be set at about one percent granularity over a total range of +/−20 percent in steps. This example result in offset values that are less than the standard frequency modes of the communication protocol that uses frequencies differing by factors of 2 or more, and the manufacturing variations are on the order of 50 parts-per-million (ppm).

Each pair can be configured to use one or more adjustment values that can be used to create an adjusted pulse repetition frequency, relative to a base pulse repetition frequency. The adjustment values can be set so that the resulting adjusted pulse repetition frequencies fall outside of the expected range of deviation.

Consistent with embodiments, an RF ranging system can use a Time-of-Flight (ToF) principle to determine the distance between two objects, or markers on objects. In some embodiments, a distance authentication protocol can be implemented that uses challenge and response communications between devices. For instance, a transceiver circuit (or just "transceiver"), of a first (challenge) device, can send out a waveform (including one or more chirps or pulses), which can then be retransmitted by a second (response) transceiver, of a second device. The originating transceiver can calculate the distance between the objects based on the amount of time it takes for retransmission to reach the originating transceiver's receiver. For example, the distance can be calculated from the total round trip time (ToF in both directions plus processing time) by subtracting the processing time, multiplying by the RF travel speed (the speed of light) and dividing by two (to account for the communications traveling the measured distance twice as part of the round trip).

Particular embodiments can be used in connection with pulse-based communication. An example of a pulse-based communication protocol is defined by the IEEE 802.15.4a standard for ultra-wideband (UWB) communication. The pulse-based protocols can use active pulse intervals during which a transmitter circuit (or just a "transmitter") can send a pulse. An impulse of energy (or just a "pulse") can be transmitted over a particular period of time (pulse duration) and can be repeated at intervals corresponding to the pulse repetition frequency. The baseband signal can be encoded using a number of different modulation schemes including, but not necessarily limited to, Binary Phase Shift Keying (BPSK), On-Off Keying (OOK), Pulse Position Modulation (PPM), and Quadrature Amplitude Modulation (QAM). The modulation scheme may also include a time hopping aspect, sometimes referred to as "dithering". For example, the pulse repetition frequency can be varied slightly from pulse to pulse (e.g., using a pseudorandom offset). According to embodiments, the baseband signal is up-converted to an RF signal (e.g., in the unlicensed range of about 3-10 GHz).

Unless otherwise stated, the pulse repetition frequency is used herein to describe the repetition frequency without a time hopping aspect. Thus, the pulse repetition frequency refers to the frequency of the pulses before time hopping offsets are added to the baseband signal. If the time hopping offsets are evenly distributed between positive and negative offsets, then the average frequency of pulses with the time hopping offsets will be equal to the nominal pulse repetition frequency.

Consistent with various embodiments and as discussed in more detail herein, the pulse repetition frequency can be derived from a base clock frequency plus (or minus) an offset value. The particular offset value can be set to a different value for each pair of transceiver devices. Moreover, the offset values can be selected so as to reduce potential collisions between transmissions of two different transceiver pairs.

Embodiments of the present disclosure are directed toward range measurements that are used as part of automotive Passive Keyless Entry (PKE) systems. For example, a PKE system can condition the opening of the doors of a vehicle upon the key and its users being within a boundary distance (e.g., a two meter boundary) of the car. Various embodiments are directed toward ranging systems that can be used with various Near Field Communication (NFC) systems. For instance, a UWB ranging system can be used as a security measure that can deny transactions if the distance between an NFC card and the NFC reader, or between two NFC cards or NFC chips, is too great. The use of such range/distance-bounding protocols can help protect against various attacks, such as relay attacks where a third transceiver intercepts communications for improper use. Embodiments are directed toward other wireless communication protocols and solutions including, but not necessarily limited to, Visible Light Communication (VLC). Similar to impulse-radio ultra-wideband (IR-UWB) communication, is a pulse-based multi-user medium communication protocol that can be used for distance ranging applications.

For the sake of simplicity, various embodiments are discussed relative to a pair of transceivers that are designed for communication with one another. Embodiments allow for the use of various features in connection with groups of three or more devices, such as might be present in multi-party communication for a (ad hoc) network.

In certain types of systems, a large number of pairs of transceivers can be active in a limited spatial area, e.g., in a parking lot in case of vehicle PKE systems, or in a shopping mall in case of NFC card reader systems. Embodiments of the present disclosure are directed toward the mitigation of interference between distance-bounding RF communications for between different pairs of transceivers. Particular aspects are directed toward mitigation that does not result in long delays before successfully completing a distance ranging determination for a distance bounding between the transceivers. For instance, the transceiver pairs can be configured with pulse repetition frequencies that match for a given pair, but that are different from pair-to-pair. For example, in NFC systems the basic NFC link could be used to pair UWB transceivers and set up a common UWB pulse repetition frequency. This can also improve the delay time for other message exchanges that would otherwise be delayed until after the distance ranging communications are successfully completed.

As discussed in more detail herein, embodiments are directed toward circuits that are designed to apply frequency offsets to a base frequency of pulse repetitions in a distance-bounding protocol. The frequency offset can be set differently for different transceiver pairs. In various embodiments, the transceiver pairs can be designed to have the same base frequency and to have their relative offsets be programmable. This can be particularly useful for manufacturing large quantities of transceiver pairs that have the same core circuitry, including a common set of clock circuits or oscillator circuits.

Figure 1:
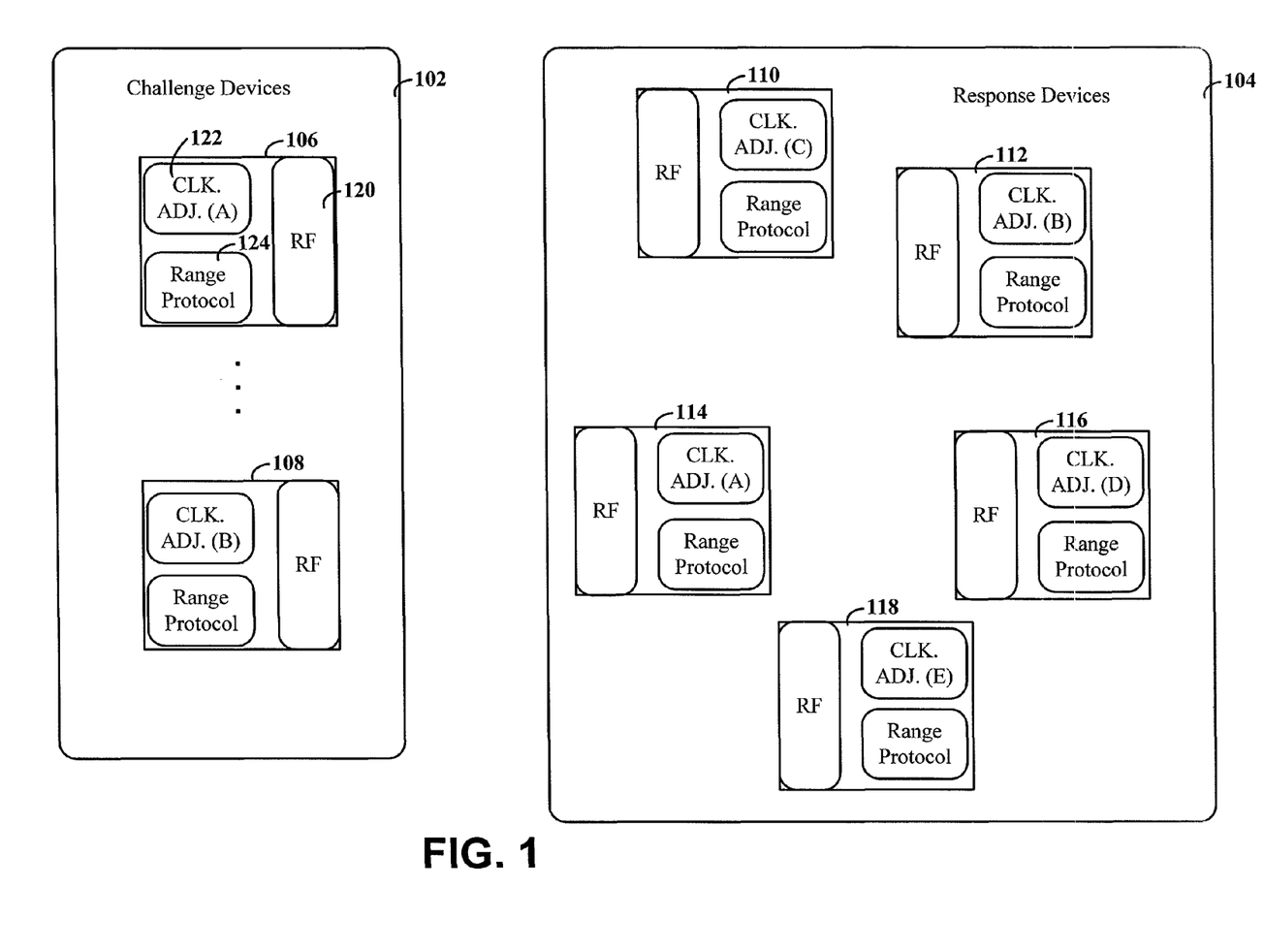
FIG. 1 depicts a block diagram for a number of different transceiver pairs, consistent with embodiments of the present disclosure.

Turning now to the figures, FIG. 1 depicts a block diagram for a number of different transceiver pairs, consistent with embodiments of the present disclosure. According to embodiments of the present disclosure, the transceiver pairs can each be configured to communicate with one another and to use a distance-bounding protocol as part of an authentication or similar security measure. Consistent with embodiments, the distance-bounding protocol can use a challenge and response in which a first one of the transceivers (part of challenge devices 102) transmits a set of pulses (challenge signal) and a second one of the receiver circuits (part of response devices 104) responds to the set of pulses (response signal). The round trip time of the challenge and response signals can be used to determine the distance between the transceiver pair.

Embodiments are directed toward challenge devices that are paired to response devices by utilizing a matching pulse repetition frequency for transmission and corresponding receipt of pulse trains used for distance bounding. For example, each of the challenge devices 106, and 108 and the response devices 110, 112, 114, 116 and 118 can include a clock adjustment circuit (e.g., 122), a ranging protocol (e.g., 124), and a RF transceiver (e.g., 120). Consistent with embodiments, the clock adjustment circuits can be programmable to allow for the challenge-response device pairs to have different pulse repetition frequencies for their ranging protocols. For example, challenge device 106 is shown as having a first adjustment "A," while challenge device 108 is shown as having a second, different adjustment "B." Similarly, response devices 104 can have different adjustments "C"-"E."

As shown in FIG. 1, there can be a number of different challenge and response devices within communication range of each other. For example, a parking lot with a high volume of vehicles and drivers coming and going might result in many PKE key fobs being within range of many different PKE vehicle transceivers. Some of the transceivers may have their respectively paired transceiver in communication range, such as the transceiver pair 106 and 114 (adjustment "A") and the transceiver pair 108 and 112 (adjustment "B"). Other transceivers may not be in communication range with their corresponding transceiver. Due to the proximity of many different transceivers, their respective distance bounding transmissions may overlap in time and potentially result in interference. Aspects of the present disclosure relate to the use of the clock adjustment circuits to mitigate this interference by setting the effective pulse repetition frequency of different transceiver pairs such that the respective pulses do not overlap for a significant amount of time. The mismatches between the different adjustment values can be set so that if pulses from different pairs do interfere with one another, they quickly diverge so as to mitigate further interference.

Particular embodiments are directed toward challenge and response devices that include a clock circuit that generates a clock at a base frequency. This clock circuit may be common between all devices, such that they each have the same base frequency (not accounting for error due to manufacturing tolerances, environmental considerations, circuit degradation over time or other sources). An adjustment circuit can be configured to respond to an input signal in order to select a value from a plurality of different adjustment values. The pulse repetition frequency for each of the transceivers can be based upon both the base frequency and the adjustment frequency. By providing a different signal to each transceiver pair, resulting in the selection of a different adjustment value, the pulse repetition frequencies can be controlled so as to mitigate interference between transceivers of different pairs. Moreover, the adjustment values can be set with a granularity that ensures that pulses from different pairs will quickly diverge from one another.

Consistent with embodiments, the adjustment values can be used in place of the use of other collision avoidance solutions, such as the use of a different startup offset coupled with retransmission using a variable startup offset in the case of collisions. For example, the use of different offsets for each pair of transceivers can still result in pulses being transmitted at the same time, in which case they would continue to overlap due to the use of a common pulse repetition frequency. Various embodiments also allow for the use of adjustment values in combination with other collision avoidance solutions, including but not necessarily limited to, different startup offsets. For instance, the combination of a startup offset/retransmission protocol with a pulse repetition adjustment might be used where the number of potential pulse repetition adjustments is insufficient to provide unique adjustment values for all pairs. In such a case, there may be a small chance of significant interference between two pairs having the same adjustment value. The use of a retransmission with a variable offset can therefore be useful for providing protection from such a situation.

In addition, the various embodiments described herein may be combined in certain embodiments, and various aspects of individual embodiments may be implemented as separate embodiments. For instance, aspects of FIG. 1 can be used for ranging applications other than those expressly mentioned herein.

Various devices, blocks, modules or other circuits may be implemented to carry out one or more of the operations and activities described herein and/or shown in the figures. In these contexts, a "block" or "device" can be implemented as one or more circuits that carry out one or more of these or related operations/activities. For example, in certain ones of the embodiments discussed herein, one or more devices can include discrete logic circuits and/or programmable logic circuits configured and arranged for implementing these operations/activities, as also shown by the blocks and circuits depicted in the figures. In certain embodiments, such a programmable circuit includes one or more computer circuits programmed to execute a set (or sets) of instructions (and/or configuration data). The instructions (and/or configuration data) can be in the form of firmware or software stored in and accessible from a memory (circuit). As an example, first and second devices include a combination of a CPU hardware-based circuit and a set of instructions in the form of firmware, where the first device includes a first CPU hardware circuit with one set of instructions and the device module includes a second CPU hardware circuit with another set of instructions.

Certain embodiments are directed to a computer program product (e.g., nonvolatile or one-time-programmable (OTP) memory circuit), which includes a machine or computer-readable medium that is not a transitory signal per se and that stores instructions which may be executed by a computer (or other electronic circuit) to perform operations/activities discussed herein.

Figure 2:
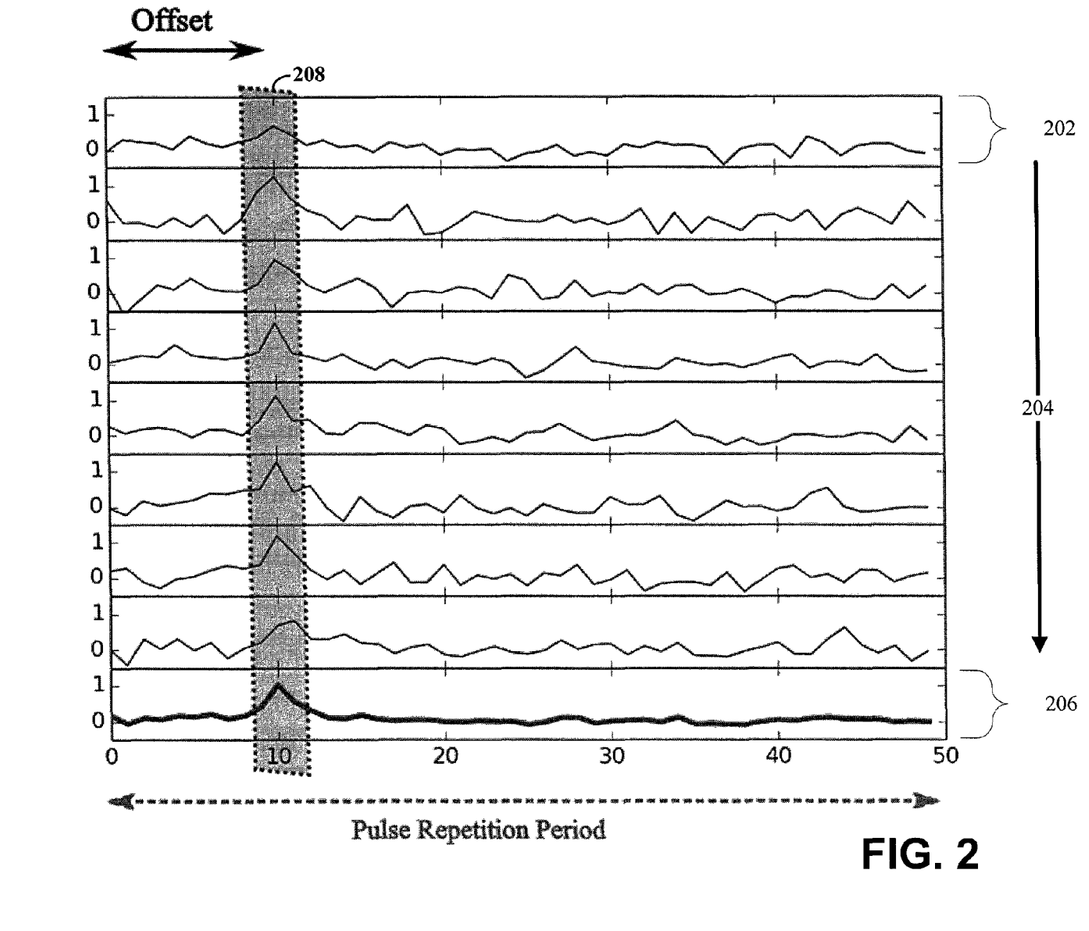
FIG. 2 shows a waveform of a received set of pulses, consistent with embodiments of the present disclosure.

FIG. 2 shows a waveform of a received set of pulses, consistent with embodiments of the present disclosure. Consistent with certain embodiments, the distance-bounding protocol can use a set of pulses that repeat according to the pulse repetition rate. The receiving device can be configured to detect pulses occurring at the particular pulse repetition frequency set for the pair of devices. Thus, the receiving device can look for pulses from the paired transmitting device using an analysis window that corresponds to the pulse repetition period (e.g., 50 units of time per the example of FIG. 2). The first window 202, can represent a single pulse repetition period, while subsequent windows in the direction of arrow 204, can represent time periods in increments of the pulse repetition period. Conceptually, the end of each row/window is connected in time to the start of the next row from top to bottom. A train of pulses that repeat at the expected (nominal or mean) frequency will have the same offset within each of the windows, as shown by box 208. The bottom row 206 represents the summation (histogram) or averaging of the signals from each of the windows, which can be useful for improved detection of a signal with a low signal-to-noise ratio.

Figure 3:
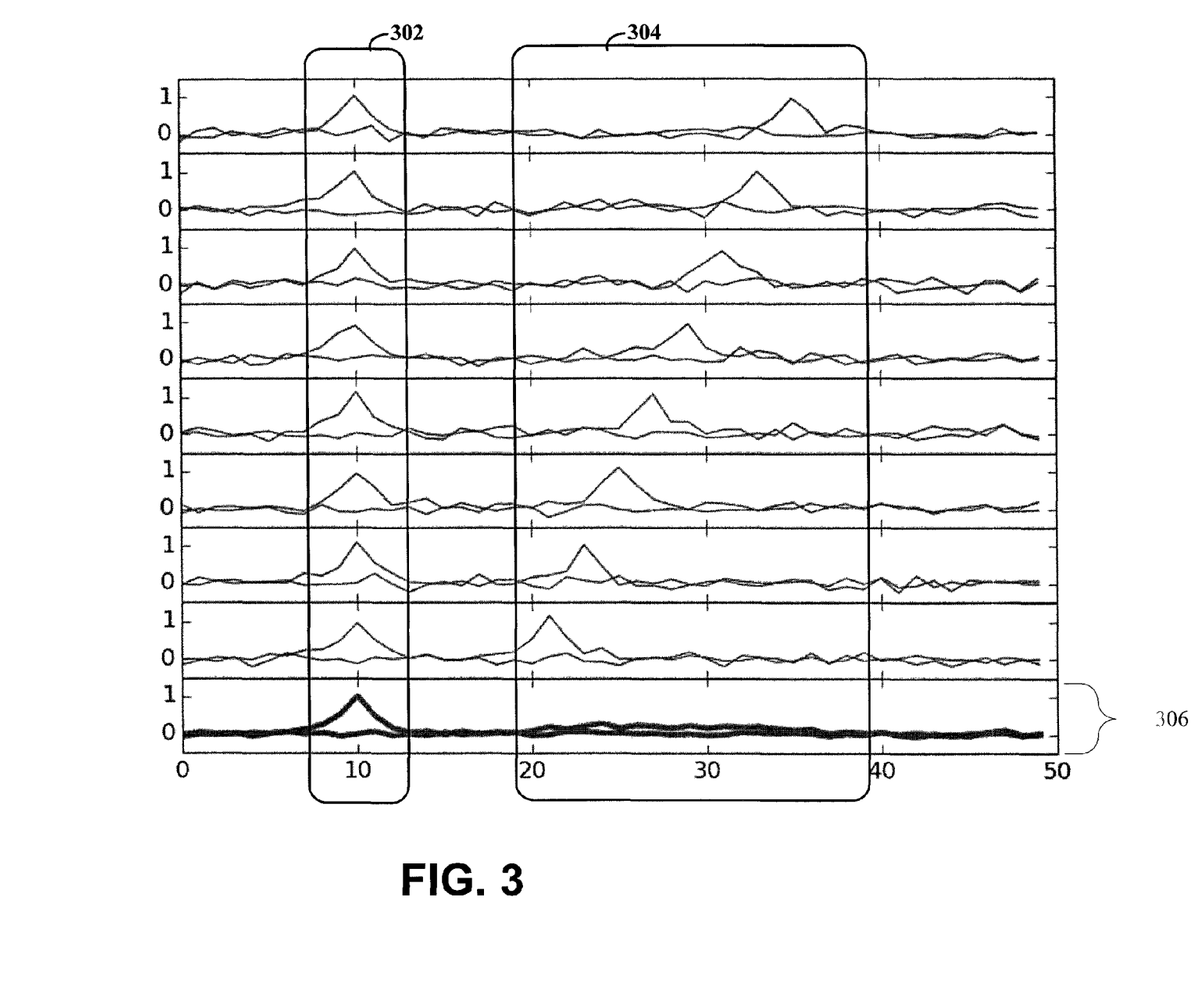
FIG. 3 shows a waveform for two received set of pulses with different repetition frequencies, consistent with embodiments of the present disclosure.

FIG. 3 shows a waveform for two received set of pulses with different repetition frequencies, consistent with embodiments of the present disclosure. Pulses within a first set of pulses 302 have a similar offset in each of the windows. This common offset is due to the first set of pulses having a pulse repetition frequency that corresponds to the pulse repetition period of the windows. Pulses within a second set of pulses 304 have different offsets in each of the windows. The different offsets are due to a mismatch between the pulse repetition frequency of the transmitted pulses and the pulse repetition period of the windows. This second set of pulses is therefore not paired with the receiver and can be considered an interfering transmitter.

Due to different pulse repetition frequencies being assigned to different pairs, the active pulse energy of the interfering transmitter is spread between different offsets within the windows. This results in the summation 306 having a clear pulse for pulses 302 and not for pulses 304. The receiver can thereby identify the proper set of pulses and carry out the ranging or distance-bounding protocol.

Consistent with certain embodiments, the adjustment values can be set so as to account for expected errors in the base frequency. For example, the granularity in the adjustment values can be set so that the difference between pulse repetition frequency division multiple access (PRFDMA) channels is greater than the expected error. In certain embodiments, the base frequency can be derived from an oscillator circuit that generates a (baseband) clock signal. The oscillator circuit could use a crystal oscillator; however, other oscillator circuit solutions are also possible. The tolerances of the various circuit components, such as the crystal, can be used to determine a range for expected error in the pulse repetition frequency. For ease of discussion, oscillator circuits are discussed relative to a crystal-based oscillator. Unless otherwise stated, other types of oscillator circuits and components are also contemplated.

Figure 4:
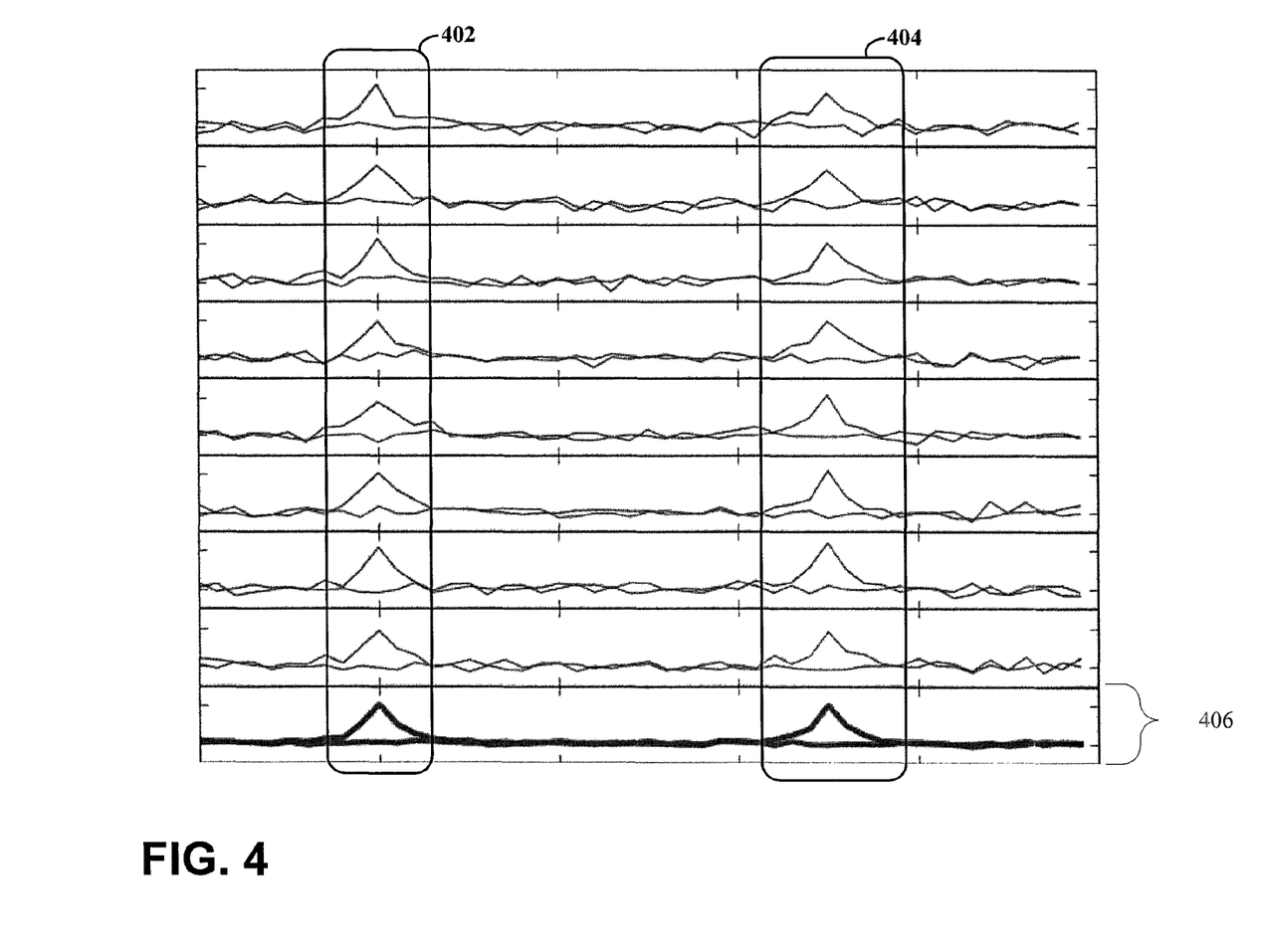
FIG. 4 depicts a waveform for two received set of pulses with a common repetition frequency, consistent with embodiments of the present disclosure.

FIG. 4 depicts a waveform for two received sets of pulses with a common repetition frequency, consistent with embodiments of the present disclosure. In case of two active transmitters, a first set of pulses 402 can be transmitted by a first transmitter, while a second set of pulses 404 can be transmitted by a second transmitter. The receiver may be unable to determine which one of the two transmitters is the validly-paired transmitter due to an ambiguity between the high energy in two different offsets for the pulse repetition periods (shown at row 406). This is an example of a situation that may occur if no adjustment values are used by the transmitter and receiver pairs. In other instances, this situation might occur if there are some pairs with the same adjustment value. For example, if there are 100 different adjustment values, each pair would still have the same adjustment value as one out of every 100 pairs. Accordingly, an additional collision compensation algorithm can be used, such as restarting transmission using a pseudorandom startup offset value, a pseudorandom pulse repetition frequency, or both.

Consistent with certain embodiments, the available pulse repetition frequencies can be kept within a small range. For instance, a solution that uses the IEEE 802.15.4a standard can set the range of pulse repetition frequencies to be between 15.6 MHz to 20.6 MHz, with 25 kHz steps between each different pulse repetition frequency. This results in 200 different frequencies, while allowing at least 500 ppm tolerance on the frequency references. Particular embodiments keep that range small enough to avoid having a pulse repetition interval that is equal to one-half of one or more other pulse repetition frequencies. In such an instance, about one half of the pulses might overlap and cause significant interference.

Figure 5:
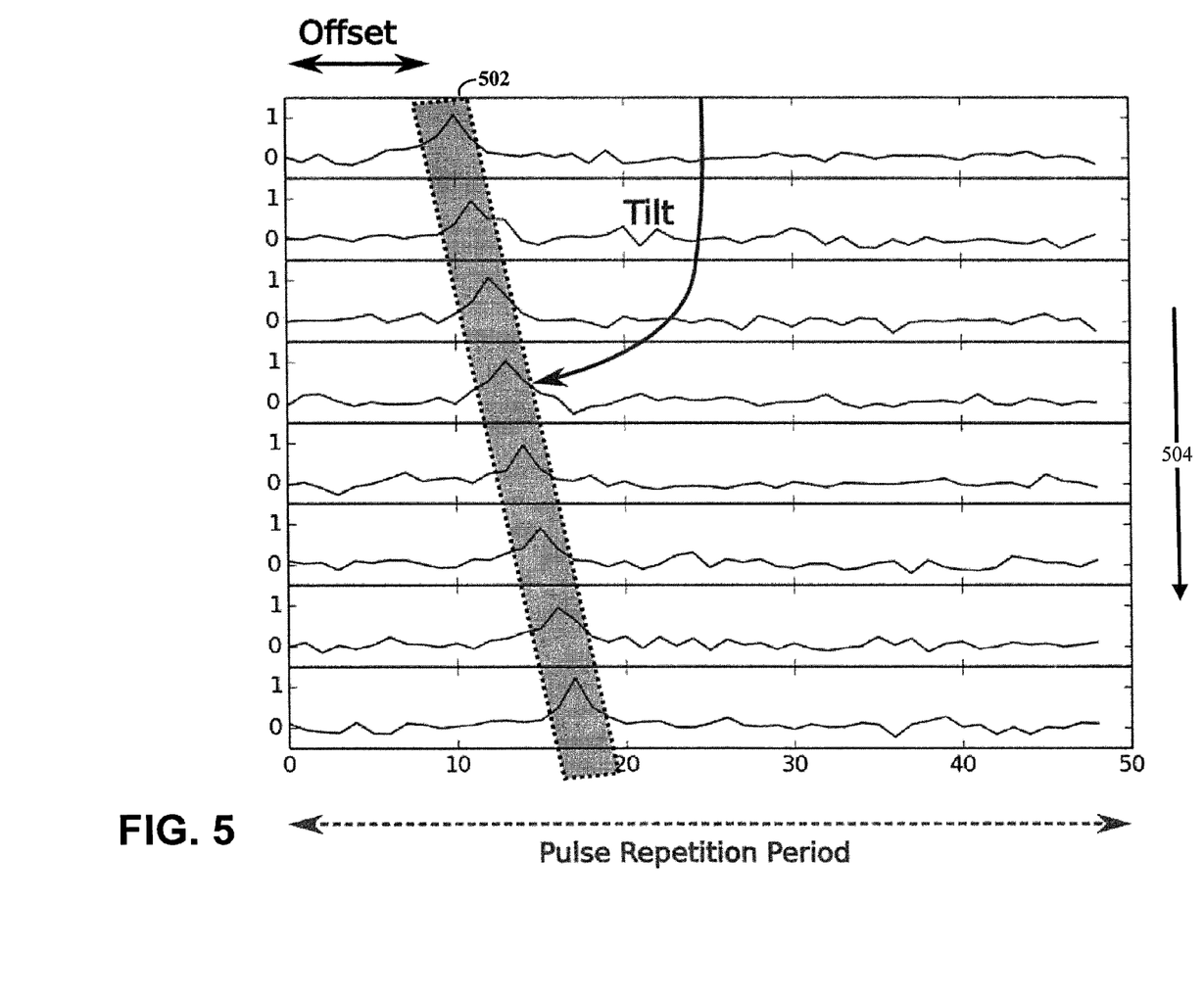
FIG. 5 depicts a waveform for a received set of pulses with a common repetition frequency and with a mismatch between receiver and transmitter timing, consistent with embodiments of the present disclosure.

FIG. 5 depicts a waveform for a received set of pulses with a common repetition frequency and with a mismatch between receiver and transmitter timing, consistent with embodiments of the present disclosure. FIG. 5 shows how tracking can be used to estimate the timing offset of the active pulse intervals with respect to the pulse repetition period, and the trend in this offset from one active pulse interval to the next for the case of a single active transmitter. Embodiments of the present disclosure relate to the recognition even when there is a low degree of overlap in time or frequency of the pulses from different transceivers, transmitted signals from one user pair can disturb the operation of analogue electronics or digital reception algorithms in a receiver of another user pair. For example, a receiver can attempt to identify the active pulse interval of a paired transmitter through the use of a periodic one-dimensional or two-dimensional histogram (of configurable/programmable length). This can be particularly useful for mismatches between transmitter and receiver timing (e.g., due to differences between crystals or other references used to generate clock signals used by the respective transceiver circuits).

As shown in FIG. 5, the offset for pulses in each consecutive window (subsequent times denoted by arrow 504) will shift from window to window if there is a timing mismatch. A two-dimensional periodic histogram of the energy of the received signal, using a period equal to the pulse repetition of paired transmitter(s), allows the receiver to identify the active pulse intervals. Although a single pulse repetition frequency pairing and histogram is depicted, it is possible that a single front-end transceiver can support multiple histograms of different lengths for corresponding pulse repetition frequencies.

For the sake of this illustration, all pulse amplitudes are assumed to be equal to one. The tilt, shown in block 502, can be due to the mismatch between the crystals that determines the time bases of the transmitter and receiver respectively, and can be estimated by the receiver. Using two-dimensional signal processing techniques, the offset and tilt can be estimated. These histograms can either use the direct received signal or the energy of the signal (e.g., using a low pass filtered version of the signals and an absolute value signal or Euclidean norm or squared Euclidean norm of a received signal).

If the mismatch between the crystals that govern the time bases of the transmitter and receiver can be neglected (in a one-dimensional histogram with a period equal to the pulse repetition interval), then the offset of the active pulse intervals with respect to the pulse repetition interval can be derived by means of the average over the respective pulse repetition intervals (consistent with FIG. 2). The storage of a one-dimensional histogram may require less memory in an implementation than a two-dimensional histogram. Also, the computational complexity can be lower for a one-dimensional histogram method.

Figure 6:
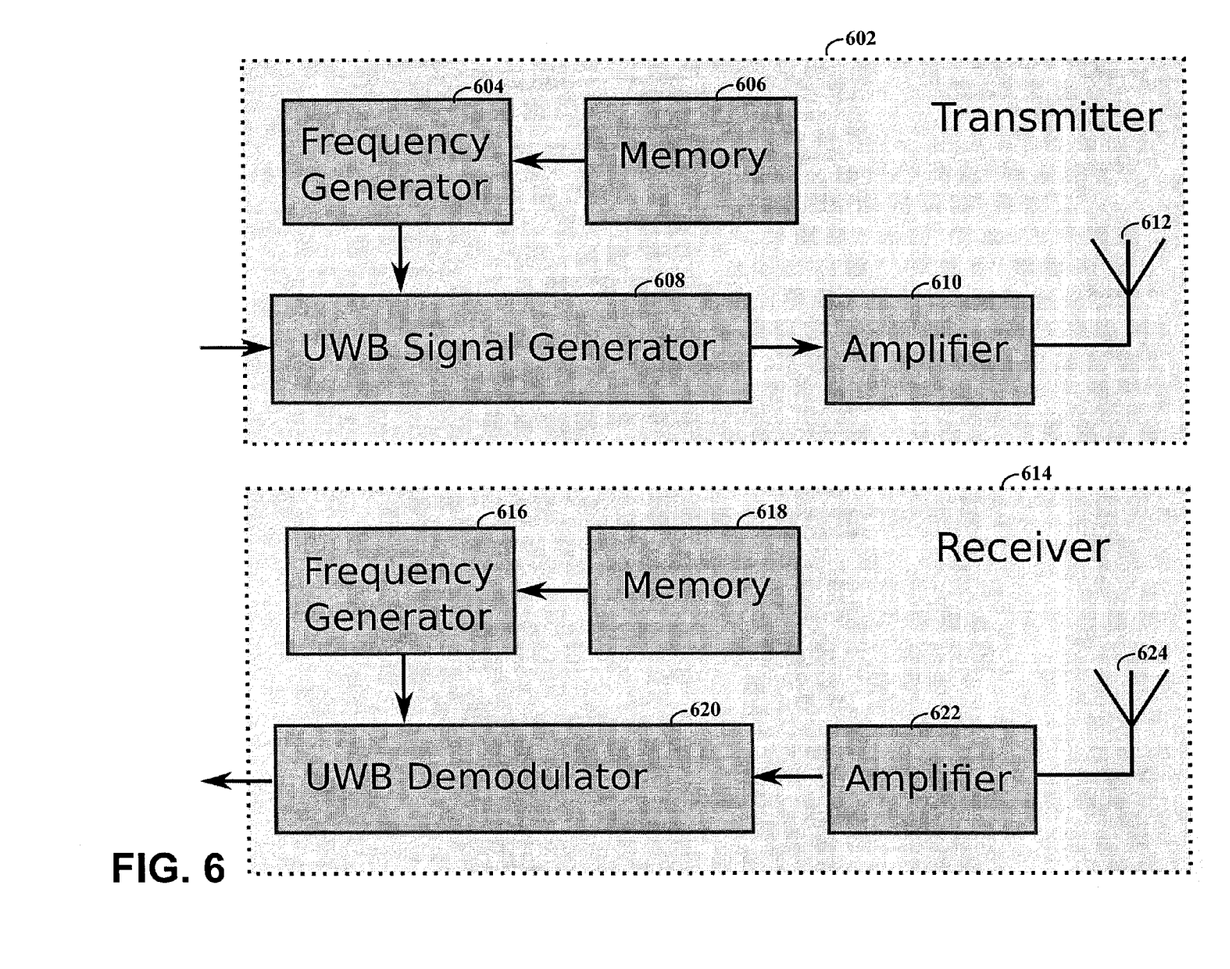
FIG. 6 depicts a block diagram of a transmitter and receiver pair configured to provide an adjusted pulse repetition period, consistent with embodiments of the present disclosure.

FIG. 6 depicts a block diagram of a transmitter and receiver pair configured to provide an adjusted pulse repetition period, consistent with embodiments of the present disclosure. Although not limited thereto, the system of FIG. 6 can be discussed in the context of an automotive PKE system in which a car key belongs to a given vehicle. The transmitter 602 can be configured to transmit a sequence of pulses that have a pulse repetition rate that is set according to a frequency offset value by frequency generator circuit 604. Frequency generator circuit 604 can include a frequency adjustment circuit that is configured to receive the frequency offset value from a memory circuit 606.

A wireless communication circuit (e.g., a UWB signal generator circuit) 608, can be configured to receive communication signals from a processing circuit (e.g., a microprocessor circuit, programmable logic device or similar data source). These communication signals can include pulses that are designed for use with a distance-bounding protocol. For example, an automotive PKE system may not allow for unlocking of a vehicle unless the key is determined to be located within two meters of the vehicle. In some embodiments, further signal processing (e.g., signal amplification) can be provided by a circuit 610 before RF transmission is carried out using antenna 612.

Consistent with embodiments, a receiver 614 can be configured to receive an RF transmission over antenna 624. Signal processing (e.g., signal amplification) circuit 622 can be used to improve signal quality of the received signal relative to decoding, detection and timing of received pulse, or other purposes. A wireless communication circuit (e.g., a UWB demodulator) 620 can be configured to demodulate the received signal to identify data from a received signal. Moreover, the data can include timing information that can be used as part of a distance-bounding protocol that identifies relevant pulses and their timings. This information can then be used to determine a distance between the transmitter and receiver.

According to embodiments, the identification of the pulses can be carried out using a frequency generator circuit 616 that provides a frequency that is a function of a frequency offset value stored in memory circuit 618. This adjustment can be applied to a base clock frequency value. The resulting frequency can be used to look for pulses having a corresponding pulse repetition frequency. In certain embodiments, the pulse repetition frequency represents the base pulse repetition frequency from which additional variations can be added according to the particular protocol (e.g., time hopping adjustments).

In various embodiments, the frequency generator circuits 604, 616 can be configured to apply any one of a number of different frequency offsets depending upon the particular value stored in memory 606. In this manner, a large number of transceiver pairs can be manufactured using the same, or similar, design. The specific pulse repetition frequency for each transceiver pair (e.g., used by a particular car key and car) can be programmed in an internal non-volatile memory at the factory. In certain embodiments, the non-volatile memory circuits 606, 618 can store other information (e.g., a private key used for verification).

Consistent with embodiments, each transceiver device of a pair can include both a transmitter and receiver circuit. The circuits can be independent, or they may share one or more components. For example, a single memory circuit and frequency generator can be used by both the receiver and transmitter of a particular transceiver device.

Figure 7:
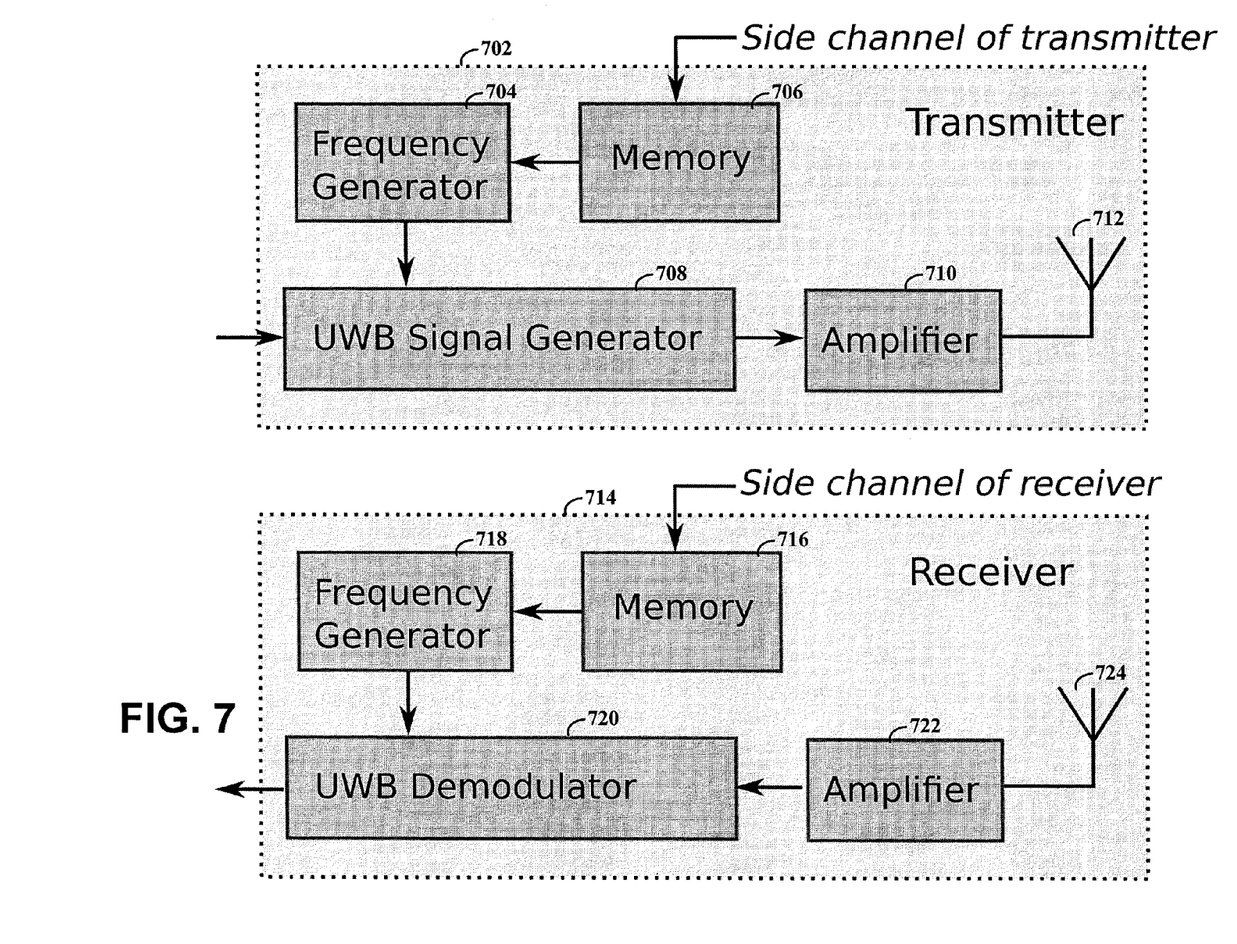
FIG. 7 depicts a block diagram of a receiver and transmitter configured to use side-channel information, consistent with embodiments of the present disclosure.

FIG. 7 depicts a block diagram of a receiver and transmitter configured to use side-channel information, consistent with embodiments of the present disclosure. Consistent with the discussion of FIG. 6, a transmitter 702 can generate an RF signal that is based upon an offset adjustment value from a memory circuit 706. Frequency generator circuit 704 can produce an adjusted signal that is used by communication circuit 708 to produce a set of pulses with a particular pulse repetition frequency. Signal conditioning circuitry 710 can then be used to transmit an RF signal using antenna 712. A receiver 714 can be configured to receive the RF signal using antenna 724, signal conditioning circuit 722 and communication circuit 720. The identification can include identifying pulses that have the particular pulse repetition frequency, as consistent with an adjusted signal from frequency generator circuit 718 and upon a frequency offset value received from memory circuit 716.

According to embodiments, the specific frequency offset value can be determined from a side channel used by the receiver and transmitter. For example, the side channel communication can be used to access a look-up table stored in the corresponding memory circuit. Agreement on the adjusted pulse repetition frequency can then be established and changed as desired, e.g., per radio packet, per fixed-length sequence of radio packets called a frame structure that consists of a number of radio packets, or until overriding new side channel information is received. A number of different side channels are contemplated. Some side channels can be provided by separate communication circuits and solutions. A few, non-limiting examples, include low frequency (LF) magnetic induction radio systems, which might also be used to communicate as a kind of beacon between a key and vehicle; NFC communication devices in the car and car key; Wi-Fi communication devices in the car and car key, or Spread Spectrum, long distance (up to several km) communication systems that are used to turn on the heating, or similar functions from a long distance; and infrared, or visible light based communication systems.

Certain side channels could use a reserved, encrypted part of the communication through the distance bounding receiver and transmitter circuits (e.g., IR-UWB). For instance, devices can be configured to use a reserved IR-UWB communication (e.g., between car key and car) at certain time intervals (e.g. every so many radio packets) that allows the devices to agree upon a particular pulse repetition frequency.

Figure 8:
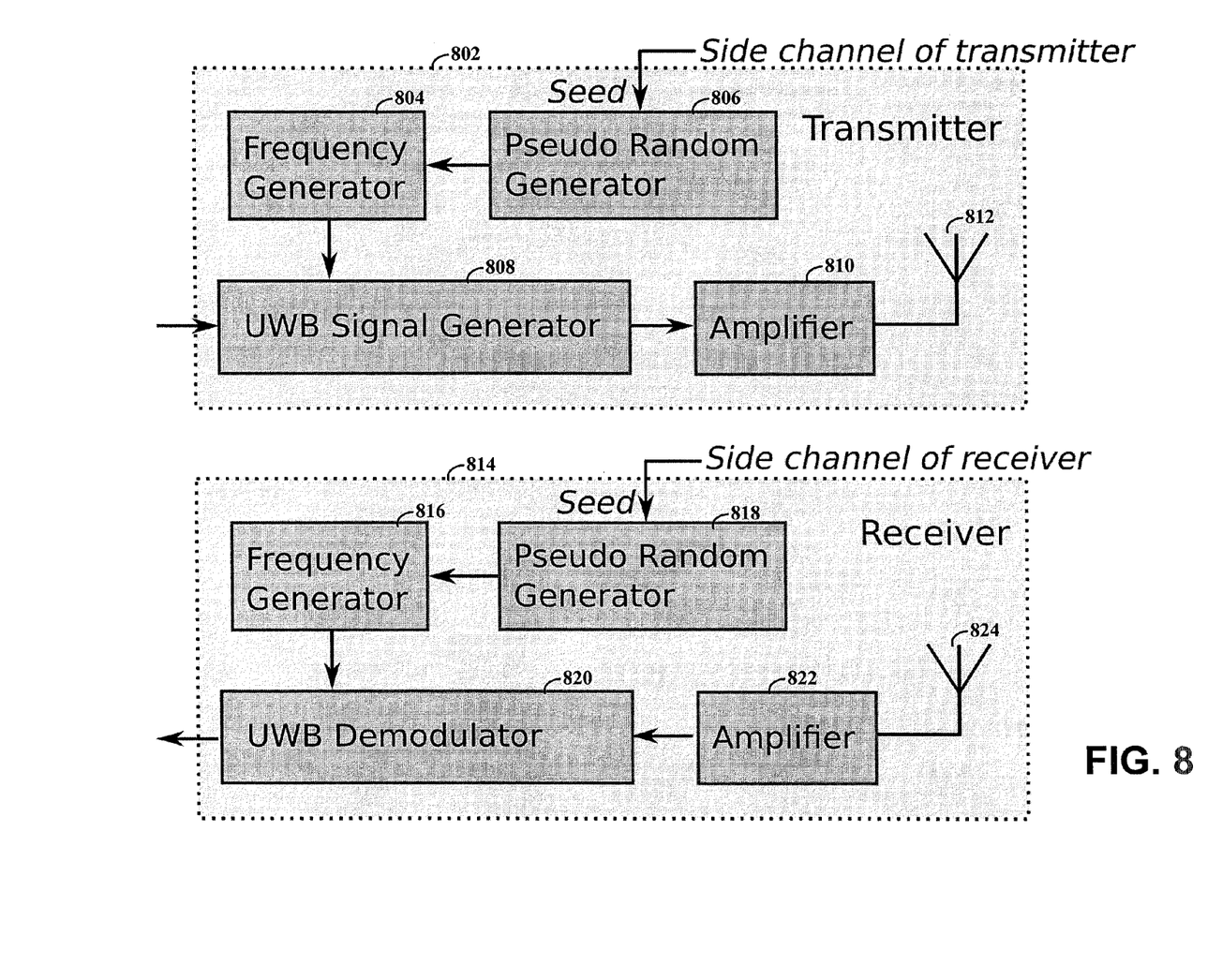
FIG. 8 depicts a block diagram of a receiver and transmitter configured to use side-channel information with a pseudorandom generator circuit, consistent with embodiments of the present disclosure.

FIG. 8 depicts a block diagram of a receiver and transmitter configured to use side-channel information with a pseudorandom generator circuit, consistent with embodiments of the present disclosure. Consistent with the discussion of FIGS. 6 and 7, a transmitter 802 can generate an RF signal that is based upon an offset adjustment value. Frequency generator circuit 804 can produce an adjusted signal that is used by communication circuit 808 to produce a set of pulses with a particular pulse repetition frequency. Signal conditioning circuitry 810 can then be used to transmit an RF signal using antenna 812. A receiver 814 can be configured to receive the RF signal using antenna 824, signal conditioning circuit 822 and communication circuit 820. The identification can include identifying pulses that have the particular (average or nominal) pulse repetition frequency, as consistent with an adjusted signal from frequency generator circuit 818 and upon a frequency offset value.

Consistent with embodiments, pseudorandom generator circuits 806, 818 can be used to produce the frequency offset value from the received side channel information. For example, the pseudorandom generator circuits 806, 818 can use a hash function to produce a value from a seed. The pseudorandom generator circuits 806, 818 might also store a frequency hopping sequence that uses the side channel information to select a starting point within the sequence. A car key and a car can both use the output of a (cryptographically secure) random generator to align on the frequency that is to be used for a given packet. Consistent with certain embodiments, the devices can be configured to use a default pulse repetition frequency in case they fail to synchronize. This can be useful to account for the car key and car communication device losing synchronization relative to the current pulse repetition frequency. A receiver can thereby check both the adjusted frequency and the default frequency for a transmission.

Consistent with embodiments, the side channel information could be provided by a sufficiently accurate clock in both transceivers. For example, the clock time could be used to derive (e.g., using look up table or generated using a hashing/cryptographic function) a particular frequency offset value for each device in the pair. In specific embodiments, an accurate clock may be derived from broadcast signals. For instance, cellular base stations transmit beacon signals that can be used to synchronize a transceiver pair. Other sources could include Wi-Fi or Bluetooth signals (e.g., from the car, car key or mobile devices such as phones present in the common vicinity of the car key and the car). Yet another source could be IEEE 802.11p Intelligent Traffic System (ITS), roadside assistance communications, or car-to-car communications, and combinations thereof.

In some embodiments, the synchronization between the car key and car occurs at certain intervals, and not continuously. Hence, the synchronization sequence can be sustained for a period of time even in the absence of the accurate clock. Once synchronization is lost, e.g., due to a poor signal-to-noise ratio, the default frequency could be used. Moreover, combinations of different side channel sources, circuits and solutions are possible.

Figure 9:
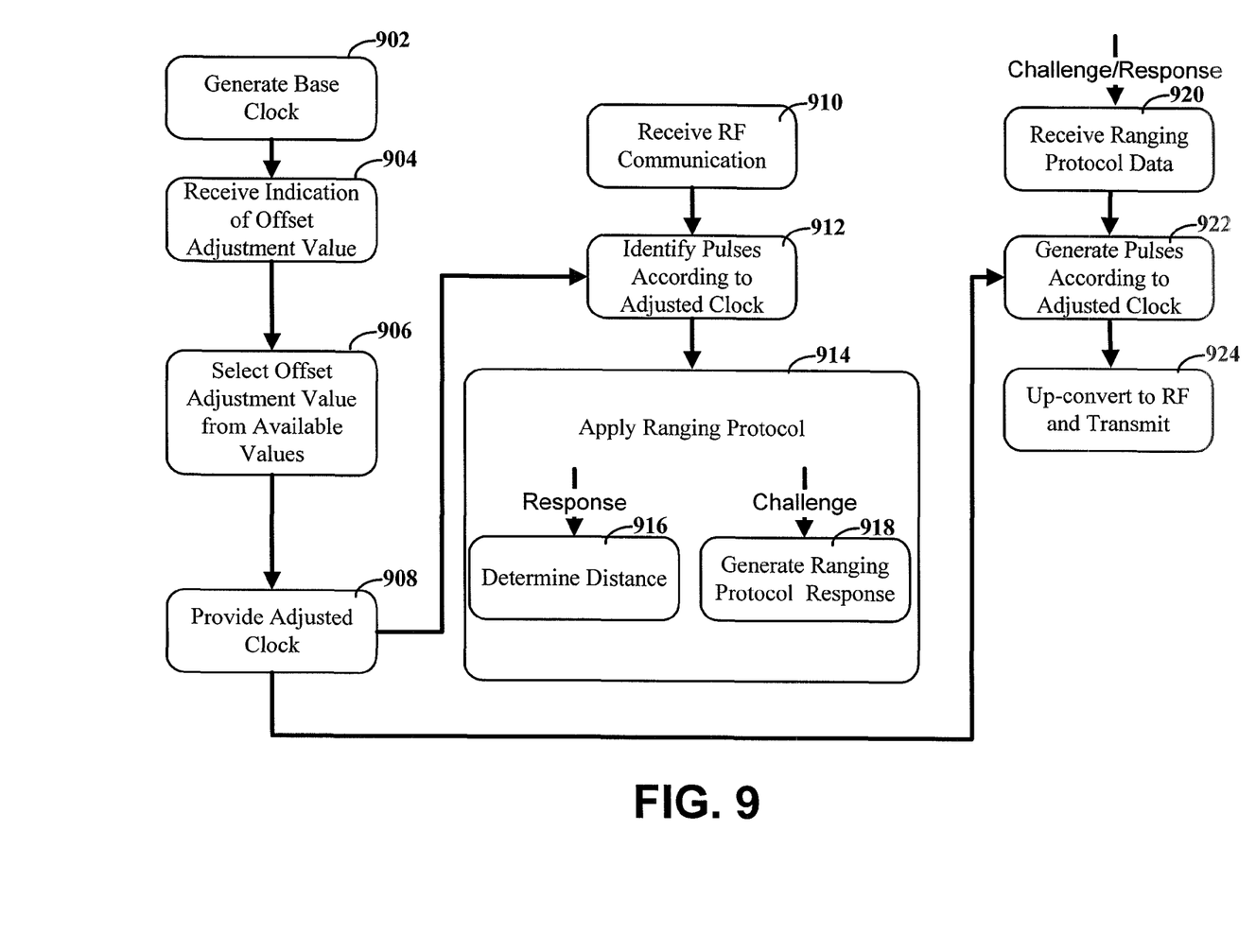
FIG. 9 depicts a flow diagram for use with transceiver pairs that are configured for distance ranging, consistent with embodiments of the present disclosure.

FIG. 9 depicts a flow diagram for use with transceiver pairs that are configured for distance ranging, consistent with embodiments of the present disclosure. A transceiver circuit includes a clock circuit that is configured to generate a base clock signal, per block 902. As discussed herein, this may include the use of an oscillation circuit, e.g., a crystal-based oscillator circuit or other solution. The transceiver device can receive an indication of an offset adjustment value, per block 904. As discussed herein, this indication can be provided from a number of sources including, but not limited to, a non-volatile memory circuit and side channel data sources.

From this indication, a signal generation circuit can be configured to select an appropriate adjustment value and provide a corresponding adjusted clock, per blocks 906 and 908, respectively. For instance, the offset indication can be a seed value that is used to generate the selected offset adjustment value (e.g., by applying a hash function or indexing into a pseudorandom list/lookup table of available adjustment values). The selected offset adjustment value can then be provided to a frequency adjustment circuit, such as a variable delay circuit.

As discussed herein, the transceiver circuit may be functioning as a receiver that receives an RF ranging communication (per blocks 910, 912, 914, 916, and 918) or as a transmitter that prepares and transmits an RF ranging communication (per blocks 920, 922, and 924). If the transceiver is functioning as a receiver and a RF ranging communication is received, per block 910, the transceiver circuit can be configured to identify pulses in the communication based upon the adjusted clock, per block 912. This may include, for instance, a histogram analysis of the received communication, where the analysis uses a window size that tracks with the adjusted clock.

The transceiver circuit can then apply a ranging protocol to the identified pulses, per block 914. The ranging protocol can be implemented differently depending upon whether the transceiver circuit is functioning as the challenge or response device. If the transceiver circuit is functioning as the response device and has received a challenge signal, the transceiver circuit can generate a ranging protocol response, per block 918. For example, this may include encoding the response using a secret key shared with the challenging transceiver circuit or device. If the transceiver circuit is functioning as a challenge device and has received a response signal, then the transceiver circuit can be configured to determine the distance from the identified pulses and their corresponding receipt times, per block 916.

If the transceiver is functioning as a transmitter, a challenge or response signal can be received, per block 920. The challenge signal can be generated by a processing circuit of a challenge device and provided to the transceiver circuit for modulation and transmission. The response signal can be provided from the receiver portion of a response device, as modified according to the ranging protocol, per block 918. In either instance, the signal can be modulated according to a pulse repetition frequency that is set based upon the adjusted clock signal, per block 922. The modulated signal can then be up-converted to an RF signal and transmitted, per block 924.

Based upon the above discussion and illustrations, those skilled in the art will readily recognize that various modifications and changes may be made to the various embodiments without strictly following the exemplary embodiments and applications illustrated and described herein. For example, a number of different encoding protocols can be used in combination with distance bounding solutions and devices discussed herein. Such modifications do not depart from the true spirit and scope of various aspects of the invention, including aspects set forth in the claims.

What is claimed is:

1. A device for providing a security function that relies upon distance bounding between a pair of devices, the device comprising:
    a signal generation circuit including:
        a clock circuit configured to generate a clock signal having a base frequency that is within an expected frequency range;
        a frequency adjustment circuit configured to:
            receive a frequency offset value;
            select, based upon the frequency offset value, a particular frequency adjustment value from a plurality of frequency adjustment values; and
            provide an adjusted clock signal having a frequency corresponding to the base frequency as modified by the particular frequency adjustment value, the particular frequency adjustment value being sufficiently large to result in the adjusted clock signal being outside of the expected frequency range;
    a wireless communication circuit configured to:
        receive communication signals; and
        identify, from the communication signals, a set of received wireless communication pulses that have a pulse repetition frequency that corresponds to the adjusted clock signal; and
    a processing circuit configured to apply a ranging protocol to the identified set of received communication pulses to verify the identified set of received communication pulses as part of a cryptographic authentication process.

2. The device of claim 1, wherein the ranging protocol includes a time-of-flight determination and a distance calculation based therefrom and wherein the adjusted clock signal has a frequency between 15.6 MHz and 20.6 MHz.

3. The device of claim 1, wherein the set of received wireless communication pulses are part of a challenge signal and wherein the processing circuit is configured to apply the ranging protocol to generate a response signal.

4. The device of claim 1, wherein the expected frequency range is an expected frequency error range of the clock circuit relative to the base frequency and wherein each of the plurality of frequency adjustment values are sufficiently large to result in the adjusted clock signal being outside of the expected frequency error range for any base frequency within the expected frequency error range.

5. The device of claim 2, wherein the processing circuit is further configured to control access to a vehicle locking system in response to the distance calculation.

6. The device of claim 2, further comprising a non-volatile memory storing the frequency offset value and configured to provide the frequency offset value to the frequency adjustment circuit.

7. A method for providing a security function that relies upon distance bounding between a pair of devices, the method comprising:
    generating, using a clock circuit, a clock signal having a base frequency that is within an expected frequency range;
    selecting, using a frequency adjustment circuit and based upon a frequency offset value, a particular frequency adjustment value from a plurality of frequency adjustment values;
    providing an adjusted clock signal having a frequency corresponding to the base frequency as modified by the particular frequency adjustment value, the particular frequency adjustment value being sufficiently large to result in the adjusted clock signal being outside of the expected frequency range;
    receiving, at a wireless communication circuit, wireless communication signals;
    identifying, from the wireless communication signals, a set of received wireless communication pulses that have a pulse repetition frequency that corresponds to the adjusted clock signal; and
    applying, using a processing circuit, a distance ranging protocol to the identified set of received wireless communication pulses to verify the identified set of received wireless communication pulses as part of a cryptographic authentication process.

8. The method of claim 7, wherein the identifying includes applying a histogram of impulses of energy from multiple sample windows that correspond to the pulse repetition frequency.

9. The method of claim 7, wherein the selecting is responsive to side channel information received from a source other than the wireless communication circuit.

10. The method of claim 9, wherein the selecting includes applying a hash function to the side channel information.

11. The method of claim 9, wherein the selecting includes seeding a pseudorandom generator circuit.

12. The method of claim 7, further comprising controlling access to a vehicle based upon a distance determined from the distance ranging protocol.

13. The method of claim 7, wherein the plurality of frequency adjustment values are each separated in frequency by a value that exceeds an expected error of the clock circuit.

14. A system for providing a security function that relies upon distance bounding between a pair of devices, the system comprising:
    a challenge device including:
        a first clock circuit configured to generate a first clock signal having a base frequency that is within an expected frequency range;
        a first frequency adjustment circuit configured to:
            receive a frequency offset value;
            select, based upon the frequency offset value, a particular frequency adjustment value from a plurality of frequency adjustment values; and
            provide a first adjusted clock signal having a frequency corresponding to the base frequency as modified by the particular frequency adjustment value, the particular frequency adjustment value being sufficiently large to result in the first adjusted clock signal being outside of the expected frequency range;
        and
        a first wireless communication circuit configured to generate a challenge signal by up converting baseband pulses with a frequency responsive to the first adjusted clock signal to radio frequency (RF); and
    a response device including:
        a second clock circuit configured to generate a second clock signal having the base frequency;
        a second frequency adjustment circuit configured to:
            receive the frequency offset value;

select, based upon the frequency offset value, the particular frequency adjustment value from the plurality of frequency adjustment values; and provide a second adjusted clock signal having a frequency corresponding to the base frequency as modified by the particular frequency adjustment value;

a second wireless communication circuit configured to:
receive the challenge signal; and
identify, from the challenge signal, a set of wireless communication pulses that correspond to the second adjusted clock signal; and a processing circuit configured to create a response signal that is based upon verification of the identified set of wireless communication pulses using a cryptographic authentication process and wherein the response signal has pulses with a frequency that is responsive to the second adjusted clock signal.

15. The system of claim 14, wherein the challenge device is further configured to determine a distance to the response device based upon a total round trip time for the challenge signal and response signals and wherein the first adjusted clock signal has a frequency between 15.6 MHz and 20.6 MHz and the RF is a frequency between 3 GHz and 10 GHz.

16. The system of claim 14, wherein the processing circuit is configured to create the response signal by applying a protocol to the identified set of wireless communication pulses.

17. The system of claim 14, wherein the challenge device is further configured to determine a distance to the response device based upon a total round trip time for the challenge signal and response signals, wherein the processing circuit is configured to create the response signal by applying a protocol to the identified set of wireless communication pulses, and wherein the response signal is encoded using a secret key, and wherein the protocol is used for wireless communication with an automobile.

18. The system of claim 14, wherein the response signal is encoded using a secret key, and transmitted using a protocol for wireless communication with an automobile, and wherein the protocol is configured to avoid collision with pulses transmitted by other systems by generating pulses according to a startup offset and to the frequency of the first adjusted clock signal.

\* \* \* \* \*